Dec. 19, 1939.   E. A. GLYNN   2,184,119
MEANS FOR REMOVING A TIRE FROM A VULCANIZING MOLD
Filed March 15, 1938   2 Sheets-Sheet 1

INVENTOR
E. A. Glynn
ATTORNEY

Dec. 19, 1939.  E. A. GLYNN  2,184,119
MEANS FOR REMOVING A TIRE FROM A VULCANIZING MOLD
Filed March 15, 1938  2 Sheets-Sheet 2

INVENTOR
*E. A. Glynn*
BY
ATTORNEY

Patented Dec. 19, 1939

2,184,119

UNITED STATES PATENT OFFICE 2,184,119

MEANS FOR REMOVING A TIRE FROM A VULCANIZING MOLD

Edwin A. Glynn, Lodi, Calif., assignor to Super Mold Corporation of California, Lodi, Calif., a corporation of California Application March 15, 1938, Serial No. 195,991

10 Claims. (Cl. 18—18)

This invention relates to full-circle tire vulcanizing molds and particularly to a horizontal mold of that type in which the upper matrix, which when in use is depressed in the mold body, must be lifted straight up in order to withdraw the same from the mold. A mold of this type, and to which my present invention is applied, is shown in my copending application for patent, Serial No. 117,304, filed December 23, 1936.

With such a form of mold and manipulation of the matrix, however, it is practically impossible to disengage the matrix from the tire, owing to the interlock of the matrix design with the tread rubber. It has therefore been necessary to distort or deform the tire, by pulling the same radially inward of the ringlike matrix, in order to remove the tire from the matrix. This however is a difficult operation to perform, especially with large tires. Also, when the matrices are arranged to fully retread rather than recap a tire it is impossible to remove any tire in this manner.

It is therefore the principal object of this invention to provide what I believe to be a novel means and method of manipulating the upper matrix of a mold of the above described type in such a manner that said matrix is easily and quickly disengaged or broken away from the tire, so as to facilitate the removal of the latter from the mold, and regardless of whether a recap or full retread matrix unit is being used. In this manner, the present difficulties and objectionable features incident to the removal of a tire from the mold, as outlined above, are entirely eliminated.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
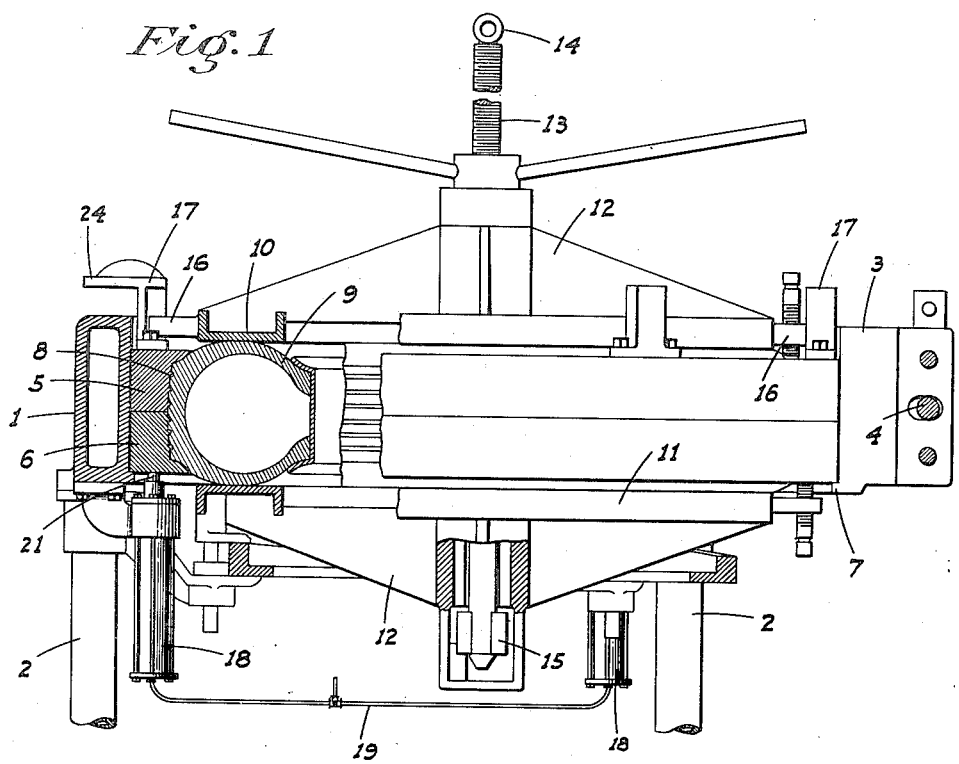
Figure 1 is a sectional elevation of a horizontal mold equipped with the preferred form of matrix raising means and with the matrix unit in an operating position.
Figure 2:
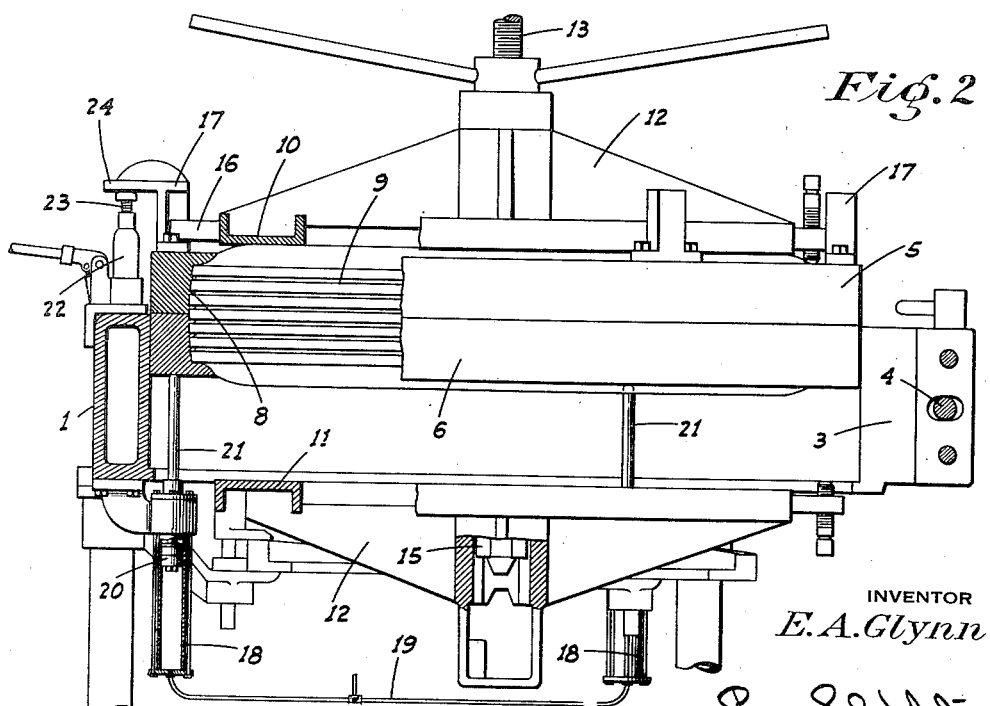
Figure 2 is a similar view showing the matrix unit raised to a position ready for breaking away from the tire and with the tilting jack in position.
Figure 3:
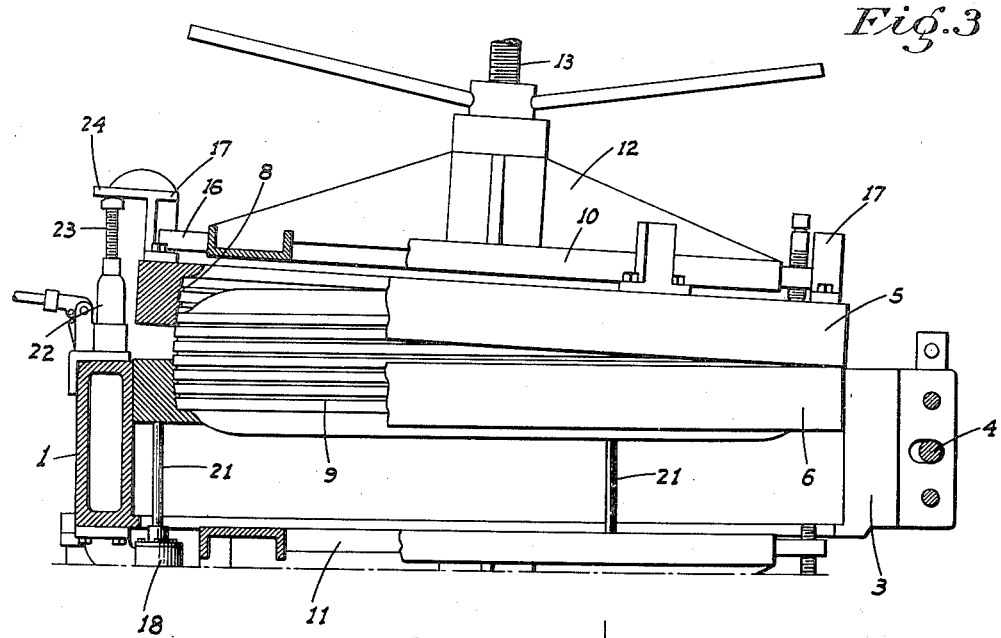
Figure 3 is a similar view showing the upper matrix tilted and partially disengaged from the tire.

Referring now more particularly to the characters of reference on the drawings, and particularly at present to Figs. 1 to 3, the essential features of the mold to which my present invention is applied comprise a horizontal ringlike steam-chambered body 1, suitably supported in a horizontal position clear of the floor on legs 2. This body is resilient metal and is radially split as at 3, the split ends being adapted to be drawn together, or allowed to spread, by suitable means such as a clamping bolt 4, controlled as described in said copending application.

The body is adapted to receive endless cooperating upper and lower matrices 5 and 6 respectively, the lower matrix 6 being normally supported on a flange 7 about the bottom of the body and the upper matrix resting on the lower one. The matrices are of course provided with tread design projections or indentations as at 8, and it is the interlocking of these indentations with the rubber of the tire 9 when the latter is being vulcanized which prevents the upper matrix being pulled vertically from the tire without damage to the rubber.

Cooperating with the matrices and positioned to engage the sides of the tire are the upper and lower pressure plates 10 and 11 respectively. The plates are provided with spiders 12 in the upper one of which is mounted a vertical shaft 13 having an eye 14 on its upper end for connection with a hoisting device. The lower end of the shaft is provided with a cross head 15 adapted for disengageable connection with the lower spider, such disengagement being effected upon a lowering and partial rotation of the shaft from an engaged position. When in such disengaged position, shown in Fig. 1, the cross head is free for upward movement through the spider as shown in Fig. 2. The purpose of this shaft is to enable the pressure plates to be brought into pressing engagement with the tire on opposite sides, while also enabling the upper plate to be lifted from the mold, the lower plate always remaining therein.

In order to also enable the upper matrix to be lifted along with the upper pressure plate, the latter is provided with radial lugs 16 adapted to engage under hanger brackets 17, mounted on the upper matrix at intervals about the same. The above described parts are all standard in the mold in question, and of themselves form no part of this invention, the application and relationship of which to the mold will not be set forth.

Supported from the body 1, preferably adjacent the legs, are vertical air cylinders 18, all connected at the bottom to a common pipe line 19 leading from a source of compressed air with of course suitable control valve means in the line.

Each cylinder has a piston 20 from which a piston rod 21 projects through the top of the cylinder and engages the bottom face of the lower matrix 6.

In operation, after the tire has been vulcanized, the shaft 13 is manipulated to disengage the cross head 15 from the lower spider 12 and place the cross head in position for withdrawal through the spider. The body clamping bolt 4 is then released to allow the body to spread or expand and release the matrices.

Air is then admitted to the cylinders 18, and since such admission is simultaneous to all the cylinders, the matrices, and the upper pressure plate, will be forced up in the body. This upward movement of the matrices is continued until the upper matrix just clears the top of the body, as shown in Fig. 2. The air feed is then shut off, and the body again clamped about the lower matrix. A jack 22 of suitable character, and which may be either hand or power operated, is then placed on top of the mold, with its movable stem 23 engaged with an overhanging bracket 24, which is preferably but not necessarily formed on one of the hangers 17. Upward movement of the jack stem lifts the upper matrix only at the corresponding point, causing said matrix to be tilted as shown in Fig. 3.

This results in an easy and gradual breaking away of the matrix from the tire without any possible damage to the latter. When the matrix is clear of the tire on the high side, a hoisting device is applied to the eye 14, and the upper pressure plate then lifts the upper matrix entirely clear of the tire. This leaves the upper half of the latter fully exposed, and it is then an easy matter to disengage the tire from the lower matrix. After the tire is removed, the body 1 is released from clamping engagement with the lower matrix, and the air, which has been retained in the cylinders 18, is now gradually exhausted therefrom to allow the lower matrix to drop gradually to its normal resting place against the flange 7.

Figure 4:
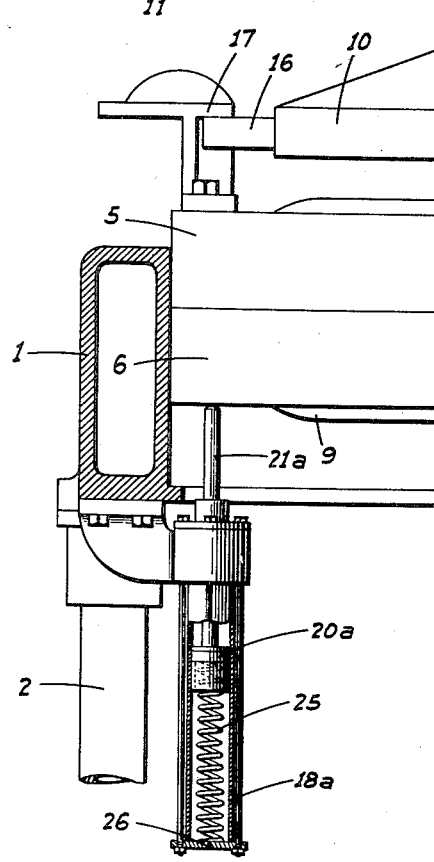
Figure 4 is an enlarged fragmentary section of the mold showing a modified form of device for supporting the lower matrix when lifted.

In the arrangement shown in Fig. 4, a somewhat different method is used to initially lift the matrices. In this case, the air cylinders 18a are not connected to a source of compressed air, but each contains a compression spring 25 bearing upwardly against the piston 20a and of a strength less than that of the weight of the lower matrix. An air bleed hole 26 is formed in the bottom of each cylinder. With this arrangement the hoist is applied to pull up on the upper pressure plate 10 and consequently on the upper matrix 5, to raise the latter to the desired level relative to the body. This lifting also imparts a lifting movement to the lower matrix, due to the interlocking connection between the tire and said matrix.

Due to the springs 25 in the cylinders 18a, the piston rods 21a follow up the lower matrix as it lifts and relieve to a certain extent the downward drag of said matrix tending to tear the same loose from the tire.

When the matrices have been raised to the desired level, the procedure previously described to tilt the upper matrix is followed as before. After the tire has been removed and the body is released from the lower matrix, the air which has been taken into cylinders 18a through the bleed holes 26 with the upward movement of the pistons 20a, is now gradually expelled by the weight of the released matrix thereon, and said matrix sinks into place in the mold gradually and without any sudden jar and drop which would tend to fracture or otherwise damage it.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a tire vulcanizing mold which includes an annular body open at one end and inner and outer matrix sections slidable into and out of the body from said open end, means to move the sections as a unit axially of the body until the outer section is just clear of the body, and means then applied to said outer section at one side to tilt the same outwardly of the body at said side.

2. A structure as in claim 1, there being means to hold the inner matrix section against movement relative to the body while the outer section is being tilted.

3. In a tire vulcanizing mold which includes an annular horizontal and open topped mold body, and upper and lower matrix sections slidable into and out of the body from its open top, means to move the sections as a unit upwardly in the body until the upper section is clear of the body, and means to then apply an upward tilting pressure to the upper matrix section at a selected point of its periphery.

4. A structure as in claim 3 in which said last named means comprises a jack disposed on top of the body, and an element rigid with the upper matrix section overhanging and engageable with the upper end of the jack.

5. A structure as in claim 3, in which said first named means comprises air pressure cylinders mounted rigid with the body below the lower matrix section, and piston rods projecting from the cylinders and engaging the bottom surface of the lower matrix section.

6. A structure as in claim 3, in which said first named means includes vertical cylinders mounted rigid with the body below the lower matrix section, piston rods projecting from the cylinders and engaging the bottom surface of the lower matrix section, and means in the cylinders exerting an upward pressure on the piston rods.

7. In a tire vulcanizing mold which includes an annular horizontal and open topped mold body, and upper and lower matrix sections slidable into and out of the body from its open top, means applied to the upper section to lift the same up until said section is clear of the body, and into a position for tilting, the matrices having tread design projections tending to interlock with the tread rubber of a tire disposed in the matrix sections whereby the tire and the lower matrix section will tend to be lifted with the upper section, and means acting on the lower matrix section from below to counteract the tendency of said section to drop from the tire as the upper section is being lifted.

8. A structure as in claim 7, in which said last named means comprises a vertical cylinder fixed with the body and disposed below the lower matrix section, a piston in the cylinder, a piston rod projecting from the piston and engaging the bottom surface of the lower matrix section, and a compression spring between the piston and the bottom of the cylinder adapted to be compressed by the weight of said lower matrix section; the cylinder having an air bleed hole below the piston.

9. A tire vulcanizing mold including a matrix unit comprising a pair of endless cooperating matching matrix sections to surround and enclose a tire, a heating device about and closely engaging both sections when the latter are in operation, means to relatively move the matrix unit and device apart without separating the matrix sections until one section is free for tilting movement and means applied to said one section to tilt the same.

10. A mold as in claim 9 with means to hold the other matrix section against movement while the one section is being tilted.

EDWIN A. GLYNN.